United States Patent Office 2,735,842
Patented Feb. 21, 1956

2,735,842

VINYL AMINO ETHER POLYMERS AND THEIR PREPARATION

Maurice Louis Auguste Fluchaire and Jean Auguste Phelisse, Lyon, France, assignors to Societe des Usines Chimiques Rhone-Poulenc, Paris, France No Drawing. Application March 21, 1952,
Serial No. 277,914

Claims priority, application France May 30, 1951

10 Claims. (Cl. 260—89.7)

This invention relates to vinyl amino ether polymers and to a process for the preparation of such polymers.

It is known that the vinyl aminoalkyl ethers, especially vinyl diethylaminoethyl ether, can be polymerised by the action of sulphur dioxide. In such a polymerisation it would be expected that, when starting with a compound represented by the general formula $CH_2=CH-O-R$, in which R represents the aminoalkyl radical, the resulting polymer would have the formula:

(I)

wherein $n$ represents an integer greater than 1. Analysis of the actual products obtained in practice, however, has shown that they contain substantial quantities (e. g. of the order of 10% by weight) of combined sulphur, even after treatment by the usual methods for removal of the sulphur dioxide. It has also been observed that, whereas the monomers possess a marked basicity, the resulting polymers are practically neutral.

The presence of this combined sulphur in the polymer is very detrimental to the final resins and renders them unsuitable for many applications in which they could otherwise be used.

As a result of research and experiment, it has now been found that new polymeric products in the form of vinyl dialkylaminoethyl ethers of the general formula:

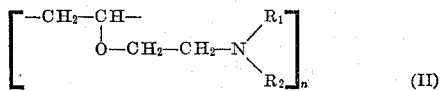

(II)

wherein $R_1$ and $R_2$ each represents hydrogen or the same or different, saturated or unsaturated, aliphatic hydrocarbon radicals or $R_1$ and $R_2$ together with the adjacent nitrogen atom represent a heterocyclic nucleus and $n$ represents an integer greater than 1, containing, at the most, traces of elements other than those represented by the foregoing formula can be obtained by treating an amino ether of the general formula:

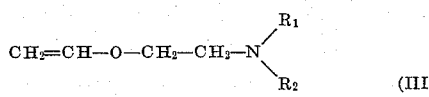

(III)

wherein $R_1$ and $R_2$ each has the same meaning as hereinbefore defined, with boron fluoride in a proportion of more than one molecule (e. g. 1.05 to 1.10 molecule) of boron fluoride per molecule of the said amino ether and removing the boron fluoride from the reaction product.

By the term "traces of elements" as used in this specification and the appended claims is meant a proportion of "foreign" elements combined in the polymer molecule which is less than 1% by weight on the polymer.

In the foregoing formula, $R_1$ and $R_2$ may, for example, each represent a saturated or unsaturated alkyl group such as an alkyl group containing from 1 to 4 carbon atoms, e. g. a methyl or ethyl group. Where $R_1$ and $R_2$ form together with the adjacent nitrogen atom a heterocyclic ring, such ring, which may contain a further hereto atom such as oxygen, is preferably a 5- or 6- membered heterocycle.

In carrying out the aforesaid process, it is preferred to use the boron fluoride in the form of a boron fluoride-ether complex, especially a boron fluoride-aliphatic ether e. g. a boron fluoride-ethyl ether complex. It is generally advantageous to add the boron fluoride condensing agent to a solution of the monomeric amino ether in an organic solvent, the agent itself being preferably also in the form of a solution in an organic solvent. The vinyl ether and the boron fluoride may be used in their usual commercially available forms.

The reaction is exothermic and the temperature of the reaction mixture may be allowed to rise spontaneously, or cooling may be applied to slow down the reaction. The reaction product may be soluble or insoluble in the reaction medium according to its nature and that of the solvent. When the reaction product is soluble, the progress of the reaction can be followed by noting the increase in the viscosity of the reaction mixture. When the reaction product is insoluble in the solvent used, the reaction has ended when the product ceases to precipitate.

The boron fluoride present in the reaction product is then removed by treatment with an alkali, preferably an alkali metal hydroxide such as potassium hydroxide. After elimination of the solvent, the dry polymer is obtained in a very good yield. This result is all the more surprising since it has been stated in French patent specification 792,721 that it is not possible to polymerise the amino vinyl ethers in the presence of acid condensation agents.

The polymers of this invention are markedly basic, requiring for their neutralisation substantially the same quantity of acid as an equal weight of monomer. They do not contain in their molecule any quantity greater than a trace of any elements other than those corresponding to the above theoretical Formula (II).

The polymers thus obtained can be used as intermediates in the manufacture of pharmaceutical products, as dressings, adhesives, sizing agents, plasticisers and the like.

The invention is illustrated by the following examples, in which all parts are by weight.

Example I 300 parts of a boron fluoride-ethyl ether complex in solution in 270 parts of benzene are progressively added to a solution of 283 parts of vinyl diethylaminoethyl ether in 270 parts of benzene over a period of 15 minutes. The reaction medium is mechanically agitated for two hours under an atmosphere of nitrogen and the temperature is maintained between 20° and 50° C.

720 parts of benzene are added to the viscous reaction mixture which is then agitated for ten minutes. To the limpid solution thus obtained there are added 2000 parts of a 25% aqueous potassium acetate solution containing 200 parts of potassium hydroxide and the mixture is agitated for 30 minutes. Two liquid layers are thus obtained, a colourless aqueous layer containing an abundant white precipitate in suspension, and a yellow, slightly turbid, benzene layer.

The benzene layer is decanted and filtered. When the benzene has been driven off by distillation 230 parts of polymer are obtained.

This polymer is a reddish-yellow, very viscous mass. It is soluble in acetone, benzene, dilute mineral acids and formic and acetic acids. On the other hand, it is insoluble in water and dimethyl formamide. One molecule of hydrochloric acid neutralises 145 g. of polymer as against 143 g. in the case of the monomer.

It may be noted, by way of comparison, that the polymer obtained from the same monomer by the method according to French patent specification 792,721, i. e. by using sulphur dioxide, contains 10% of sulphur, is soluble in water and gives practically no reaction with hydrochloric acid.

*Example II*

Two solutions are prepared: solution A, consisting of 100 parts of vinyl dimethylaminoethyl ether in 400 parts of diethyl ether, and solution B, consisting of 135 parts of boron fluoride-ethyl ether complex in 216 parts of diethyl ether. 340 parts of solution B are progressively added to solution A while the reaction mixture is maintained at a temperature between 4° and 8° C. and after heating the mixture to 34° C. the remainder of the solution B is then added. A resin insoluble in the reaction medium then precipitates.

The limpid, colourless ethereal layer is decanted, whereafter the resin is dissolved in 400 parts of acetone. The acetone solution obtained is brought to its boiling point for a few minutes, and two liquid layers are then formed; an upper acetone layer, which is slightly yellowish, and a lower resinous layer, which is very viscous.

The upper acetone layer is run off and the resinous layer dissolved in 500 parts of water to produce a limipid, reddish aqueous solution which is poured into 2000 parts of a 25% aqueous potassium acetate solution containing 50 parts of potassium hydroxide. On agitation, a very viscous layer rises to the surface, above a colourless aqueous solution which contains the fluorine used in the reaction.

The upper layer is then removed and dissolved in 900 parts of methyl ethyl ketone. When hte methyl ethyl ketone is removed by distillation, 90 parts of polymer remain.

This polymer is a less viscous mass than that of Example I. It is soluble in water, dimethyl formamide and acetone.

We claim:

1. A sulphur-free homopolymer of a vinyl dialkylaminoethyl ether corresponding essentially to the general formula:

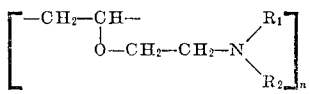

wherein $R_1$ and $R_2$ each represents a methyl group and $n$ represents a large integer.

2. A sulphur-free homopolymer of a vinyl dialkylaminoethyl ether corresponding essentially to the general formula:

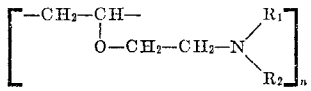

wherein $R_1$ and $R_2$ each represents an ethyl group and $n$ represents a large integer.

3. A process for preparing a polymeric vinyl dialkylaminoethyl ether which comprises reacting an ether represented by the general formula:

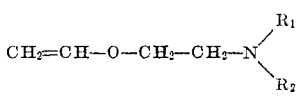

wherein $R_1$ and $R_2$ are the same and each is an alkyl group containing at most 2 carbon atoms, with boron-fluoride in a proportion of more than one molecule of boron-fluoride per molecule of the said amino ether and removing the boron-fluoride from the product.

4. A process for preparing a polymeric vinyl dialkylaminoethyl ether which comprises reacting an ether represented by the general formula:

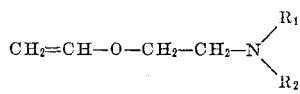

wherein $R_1$ and $R_2$ are the same and each is an alkyl group containing at most 2 carbon atoms, with a boron-fluoride ether complex in a proportion of more than one molecule of the boron-ffuoride ether complex per molecule of the said amino ether and removing boron-fluoride from the product.

5. A process for preparing a polymeric vinyl dialkylaminoethyl ether which comprises reacting an ether represented by the general formula:

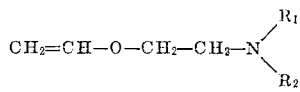

wherein $R_1$ and $R_2$ are the same and each is an alkyl group containing at most 2 carbon atoms, with a boron-fluoride-aliphatic-ether complex in a proportion of more than one molecule of boron-fluoride-alipathic-ether complex per molecule of the said amino ether and removing boron fluoride from the product.

6. A process for preparing a polymeric vinyl dialkylaminoethyl ether which comprises reacting an ether represented by the general formula:

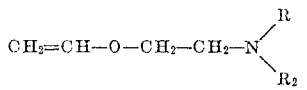

wherein $R_1$ and $R_2$ are the same and each is an alkyl group containing at most 2 carbon atoms, with a boron fluoride-ethyl-ether complex in a proportion of more than one molecule of boron fluoride-ethyl-ether complex per molecule of the said amino ether and removing boron fluide from the product.

7. A process according to claim 6 wherein the amino ether is treated in solution in an organic solvent.

8. A process according to claim 3 wherein the boron fluoride is used in solution in an organic solvent.

9. A process as claimed in claim 3 wherein the residual boron fluoride is removed from the polymer by treatment with an alkali.

10. A sulphur-free homopolymer of a vinyl dialkylaminoethyl ether corresponding essentially to the general formula:

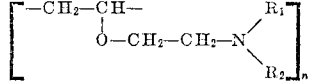

wherein $R_1$ and $R_2$ are the same and each represents an alkyl group containing at most 2 carbon atoms, and $n$ represents a large integer.

References Cited in the file of this patent

UNITED STATES PATENTS

| 2,066,076 | Reppe | Dec. 29, 1936 |
| 2,188,778 | Reppe | Jan. 30, 1940 |
| 2,601,251 | Bruson et al. | June 14, 1952 |

FOREIGN PATENTS

| 378,544 | Great Britain | Aug. 18, 1932 |
| 443,978 | Great Britain | Mar. 11, 1936 |

OTHER REFERENCES

Modern Plastics, February, 1946, pages 169 to 171.